United States Patent [19]

Dion

[11] Patent Number: 5,085,940
[45] Date of Patent: Feb. 4, 1992

[54] DECORATIVE LAMINATE HAVING CORE SHEET IMPREGNATED WITH VINYL ESTER RESIN

[75] Inventor: Andrew Dion, Temple, Tex.

[73] Assignee: Ralph Wilson Plastics Co., Temple, Tex.

[21] Appl. No.: 569,176

[22] Filed: Aug. 17, 1990

[51] Int. Cl.$^5$ ............................................. B32B 27/38
[52] U.S. Cl. .................................. 428/413; 428/530; 428/537.5; 428/904.4
[58] Field of Search ................... 428/413, 530, 537.5, 428/904.4

[56] References Cited

U.S. PATENT DOCUMENTS

| | | | |
|---|---|---|---|
| 4,314,002 | 2/1982 | Oizumi et al. | 428/414 |
| 4,322,505 | 3/1982 | Jacobs | 525/44 |
| 4,595,734 | 6/1986 | O'Hearn | 525/524 |
| 4,636,443 | 1/1987 | Jaisle | 428/481 |
| 4,741,968 | 5/1988 | Dion | 428/480 |

OTHER PUBLICATIONS

Burrell, P. et al., "Vinyl Esters (Epoxy Acrylates) in Marine Composites Studies in Blister and Fatigue Resistance", *The British Plastics Federation Congress* '88, pp. 1-15.

Goodman, Sidney H., "Handbook of Thermoset Plastics", pp. 76-81.

Technical Bulletin, "CoRezyn ®, Vinyl Ester Resins".

*Primary Examiner*—Merrell C. Cashion, Jr.
*Assistant Examiner*—D. S. Nakarani
*Attorney, Agent, or Firm*—Pravel, Gambrell, Hewitt, Kimball & Krieger

[57] ABSTRACT

A heat and pressure consolidated decorative laminate having at least one core sheet in which is impregnated a vinyl ester resin. The resin is preferably derived form an epoxide terminated resin and an ethylenically unsaturated carboxylic acid. A particularly preferred epoxide terminated resin is the reaction product of bisphenol A and epichlorohydrin. Particularly preferred as the ethylenically unsaturated carboxylic acid are acrylic and methacrylic acid. The color of the core sheet(s) of the decorative laminates of this invention matches that of the face and optional back sheets. The laminates exhibit high heat resistance, flexibility, and good resistance to cracking and tearing.

28 Claims, No Drawings

5,085,940

DECORATIVE LAMINATE HAVING CORE SHEET IMPREGNATED WITH VINYL ESTER RESIN

The present invention relates to a heat and pressure consolidated decorative laminate having at least one core sheet in which is impregnated a vinyl ester resin. The vinyl ester resin is preferably derived from an epoxide terminated resin and an ethylenically unsaturated carboxylic acid.

BACKGROUND OF THE INVENTION

Heat and pressure consolidated decorative laminates have historically been prepared from a core material comprising a plurality of phenolic resin impregnated kraft paper sheets, a face sheet impregnated with a melamine-formaldehyde resin and optionally a melamine resin impregnated overlay sheet. Such high pressure laminates have been used world-wide as construction materials for wall panels and countertops.

Decorative laminates having melamine-formaldehyde and polyester impregnated core sheets have recently been reported. Such laminates offer several distinct advantages over those in which a phenolic-based core material is employed. Most notably, the color of the core of the laminate matches that of the face or decor sheet. As a result, the dark edge line that is perceptible when conventional laminates are cut, is eliminated.

For instance, in U.S. Pat. No. 4,448,849 a melamine-formaldehyde resin containing a hydroxylmelamine is disclosed for impregnating core sheets and/or the decor sheet and/or the overlay sheet to provide a laminate with a solid color edge matching that of the core surface. Further, in U.S. Pat. No. 4,741,968, a laminate is disclosed wherein a polyester comprising the reaction product of a polyhydric alcohol, saturated dicarboxylic acid and unsaturated dicarboxylic acid is impregnated in the core sheet. The polyester impregnated core sheet offers distinct advantages over laminates containing a core sheet impregnated with melamine formaldehyde. In addition to being more tear resistant, the polyester impregnated core sheet containing laminates are characterized by greater flexibility, machinability, and punchability than laminates containing a melamine formaldehyde impregnated core sheet. In addition, the polyester impregnated core sheet containing laminates are less resistant to crazing than laminates containing melamine-formaldehyde, as evidenced by cracking tests. Unfortunately, the polyester containing laminates are unable to exhibit the high level of heat resistance exhibited by laminates containing a melamine formaldehyde impregnated core sheet.

SUMMARY OF THE INVENTION

The present invention provides a high pressure decorative laminate exhibiting increased heat and tear resistance than the polyester impregnated core containing laminates of the prior art. In addition, the laminates of this invention exhibit the highly favorable flexibility, machinability, punchability and low cracking properties of the polyester containing laminates. Like the melamine formaldehyde and polyester impregnated containing laminates of the prior art, the color of the laminates of this invention matches that of its face or decor sheet.

In particular, the invention comprises a laminate containing at least one core sheet impregnated with a core sheet treating composition comprising a vinyl ester resin and an ethylenically unsaturated carboxylic acid. A catalyst for further curing and thermosetting the resinous components in the core sheet is further included, along with an organic solvent. The invention further comprises a laminate containing, contiguous to the core sheet, a thermosetting melamine/formaldehyde reaction product impregnated face sheet. A melamine/formaldehyde reaction product impregnated back sheet may further be adjacent to the core sheet. The face sheet, core sheet(s), and the optional back sheet are consolidated by heat and pressure. The use of a vinyl ester resin in the core sheet treating composition renders greater flexibility and increased heat resistance to the consolidated laminate and further causes it to be less susceptible to cracking and tearing. The laminates of this invention are easily fabricated and further are characterized by a color in the core sheet(s) that matches that of the face and optional back sheets.

The present invention further provides a heat and pressure consolidated laminate comprising (a) a thermosetting melamine/formaldehyde reaction product impregnated face sheet; (b) at least two colored core sheets, each core sheet impregnated with a core sheet treating composition comprising a liquid thermosetting epoxy-based vinyl ester resin, and an ethylenically unsaturated crosslinking monomer; and (c) an optional thermosetting melamine/formaldehyde reaction product impregnated back sheet.

The resulting consolidated laminate exhibits improved flexibility as evidenced by a wrap test conducted at ambient or room temperature in which the resulting laminate wraps around a 2 to 3 inch radius compared to a current commercially available laminate with core sheets impregnated with a melamine/formaldehyde reaction product which wraps around a 5 to 6 inch radius. In addition, the consolidated laminate exhibits improved heat resistance and is less sensitive to cracking and tearing than the laminates of the prior art as evidenced by NEMA radiant heat test LD3.7, NEMA blister resistance test LD3.15 and craze resistance tests.

DETAILED DESCRIPTION OF THE INVENTION

In general, in accordance with the invention, the core sheets are made by impregnating a cellulosic paper pigmented in color to conform with the color of the face sheet, and the face and back sheets produced by impregnating an alpha cellulose paper optionally containing a pigment or a print, pattern or design. Typically, a paper of about 60 to about 160 pound basis weight per 3000 square foot ream is employed for the core sheets while the alpha cellulose sheet used in the face layer generally runs from about 40 to about 120 pound basis weight per 3,000 square foot. The core sheets may be comprised of any of several saturating grade papers, such as alpha cellulose, bleached kraft or cotton linter paper, which are capable of being colored to a close match to the decor or face sheets.

The vinyl ester resin in the core sheet treating composition does not affect the color of the pigmented core sheets. The resin is also color stable over substantially long periods of time and demonstrates excellent resistance to acids, alkalies and oxidizing chemicals.

The vinyl ester resin in the core sheet treating composition further provides increased flexibility and wear resistance to the laminate, is characterized by terminal ethylenic unsaturation and is essentially free of epoxide groups. Preferred vinyl esters are characterized by an SPI Gel time at 180° F. of between about 10 to about 13 minutes and a Brookfield Viscosity 77° F., #3 spindle at 60 rpm of about 400 to about 500 cps. It is preferably derived from the reaction of an epoxide terminated resin and an organic carboxylic acid having alpha, beta ethylenic unsaturation. The ethylenically unsaturated terminal groups are reactive with each other and with the ethylenically unsaturated crosslinking monomer during cure of the resin. The epoxy equivalent weight of the epoxy based vinyl ester resin is generally between about 7,000 to about 20,000 and more preferably about 9,000 to about 10,000.

The epoxide resin employed as the starting resin in this invention is preferably a diglycidyl ether epoxy resin of the type derived from a bisphenol compound such as Bisphenol-A and a halo-epoxy-substituted alkane such as epichlorohydrin. Other epoxy resin starting materials which can be employed include the epoxidized phenol formaldehyde novolac resins, as well as epoxide resins derived from polyhydric alcohols such as alkane-diols, -triols.

Particularly desired epoxide resin starting materials. Such resins desirably exhibit an epoxide equivalent weight in the range of from about 150 to about 1,000; an epoxide equivalent weight of about 192 being preferred.

Such epoxy based vinyl resin can be prepared by reacting an unsaturated carboxylic acid with a condensation product of bisphenol A and epichlorohydrin. Reaction of the polyepoxide resin through its epoxy groups with at least a stoichiometric quantity of the unsaturated organic acid are well known in the art. In general, approximately 2 to about 10 parts by weight of bisphenol-A epoxy is reacted with from about 3 to about 21 parts by weight of carboxylic acid. Preferred of the unsaturated carboxylic acids are those containing 3 to 4 carbon atoms, most preferably acrylic acid and methacrylic acid. Methacrylic acid is especially preferred.

A particularly preferred vinyl ester resin is of the formula:

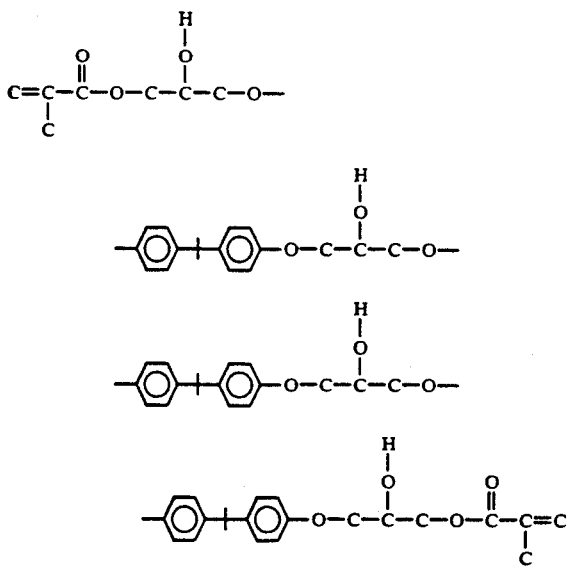

The organic carboxylic acid having ethylenic unsaturation to which the epoxide terminated resin is reacted is desirably monobasic and may be selected from acrylic, methacrylic, crotonic, isocrotonic, and cinnamic, as well as higher alkylated acrylic acids such as ethyl, propyl and butyl-substituted acrylic acids. Suitable dicarboxylic acids are typified by maleic and fumaric acids. It is also possible to employ half-esters formed by esterification of one mole of a hydroxy compound (such as an alcohol) with one mole of an anhydride of an ethylenically unsaturated dicarboxylic acid such as maleic acid anhydride. Speaking broadly, the unsaturated organic acid should have at least one carboxyl group and should further have ethylenic unsaturation so as to provide the epoxide-terminated resin with a significant number of ethylenically unsaturated terminal groups which in turn may participate in addition polymerization reactions with ethylenically unsaturated groups of the epoxide vinyl ester resin, or, preferably, with the ethylenically unsaturated crosslinking monomer.

The vinyl ester resins of this invention may be crosslinked, or cured, by the use of heat alone. A catalyst is preferably used for curing the vinyl ester resin in preparing the core sheet impregnate. In particular, the terminal carbon-carbon double bond enters free radical polymerization or cure when initiated by such free radical catalysts as organic peroxides and inorganic persulfates. Suitable peroxy catalysts include t-butyl perbenzoate; 2, 5-dimethyl-2, 5-bis (2-ethylhexanolyperoxy)hexane; and 1, 1-di-tert-butylperoxy-3, 3, 5-trimethyl cyclohexane. The preferred catalyst is t-butyl perbenzoate.

The resin is preferably combined with an ethylenically unsaturated crosslinking monomer in which it is soluble and which affords the resulting composition a low viscosity index. Suitable ethylenically unsaturated monomers are styrene, divinylbenzene, alpha-chlorostyrene, p-bromostyrene, t-butylstryene, methyl methacrylate, 2,3-dibromomethyl methacrylate, etc. Low-viscosity liquid monomers, particularly styrene, are preferred. The amount of ethylenically unsaturated crosslinking monomer employed is generally between about 20 to about 60 percent by weight of the core sheet treating composition. Preferably the amount of ethylenically unsaturated crosslinking monomer is between about 20 to about 60, preferably between 30 to about 40, most preferably 36, weight percent.

A phenolic antioxidant is also preferably added to the core sheet treating composition. The antioxidant serves to improve shelf life of the resinous system and the prepeg by increasing the opportunity for termination reactions of the vinyl ester resin. The phenolic antioxidant may include various alkylated phenols, hindered phenols and phenol derivatives such as t-butyl hydroquinone, butylated hydroxyanisole, polybutylated bisphenol A, butylated hydroxy toluene (BHT), alkylated hydroquinone, 2,6-ditert-butyl-paracresol, 2,5-ditert-aryl hydroquinone, octadecyl-3-(3,5-di-tert-butyl-4-hydroxy phenyl) propionate (Irganox 1076), tetra-kis [methylene 3-(3', 5'-di-tert-butyl-4'-hydroxyphenyl) propionate] methane (Irganox 101), 2, 2' ethylidene bis (4,6-di-tert-butylphenol) (Isonox 129); or 1,3,5-tris (4-tert-butyl-3-hydroxy-2, 6-dimethyl benzyl)-1, 3, 5-triazine-2, 4, 6-(1H, 3H, 5H)-trione (Cyanox 1790). A preferred phenolic antioxidant is CaO-3, a butylated hydroxy toluene commercially available from Sherex Chemical Company. Amounts of antioxidant in the range of from about 0.001% to about 0.5%, and preferably from 0.01 to 0.10%, most preferably 0.05%, by weight of core sheet treating composition are acceptable.

The vinyl ester treating composition generally is a solution of about 20 to 100 percent by weight solids, the preferred amount being about 70 to 90 percent by weight, and the optimum amount being about 80 or 85 percent by weight.

In general, the core sheet treating composition for impregnating each of the core layers contains about 30 to 60 parts by weight of the vinyl ester resin, about 1 to about 70 percent by weight of ethylenically unsaturated crosslinking monomer, about 10 to 60 parts by weight of organic solvent, and about 1 to 10 percent by weight of free-radical initiating catalyst. A particularly preferred composition comprises approximately 45 parts by weight of vinyl ester resin, about 36.5 parts by weight ethylenically unsaturated crosslinking monomer, most preferably styrene, about 2.5 parts by weight of free radical initiator, most preferably, t-butyl perbenzoate, and about 16 parts by weight organic solvent. The solvent is preferably a ketone containing up to 8 carbon atoms. Suitable solvents include methyl ethyl ketone, acetone and methyl isobutyl ketone. Acetone is most preferable.

The vinyl ester impregnated core sheets further assist in providing to the resultant consolidated laminate the greatly improved flexibility over the laminates of the prior art. The laminate of this invention are flexible enough at ambient temperature to wrap around a 2 to 3 inch radius without breaking. This is in sharp contrast to the melamine/formaldehyde impregnated core sheet laminates of the prior art that can only wrap around a 5 to 6 inch radius.

In impregnating the face sheet, as is known in the art, a thermosetting melamine/formaldehyde reaction product is used that is preferably a precondensate prepared from generally about 1.0 to 2.7 moles and most preferably about 1.5 to 2.25 moles of formaldehyde per mole of melamine. Optionally, small amounts, e.g., about 1 to 20 weight percent based on the weight of the reaction product, of modifiers can be used, such modifiers including dicyandiamide, ortho-paratoluenesulfonamide, sucrose, and glycols such as diethylene glycol.

Further, the face sheet can be impregnated by a vinyl ester resin, preferably the same vinyl ester resin used in impregnating the core sheets herein.

In preparing the multiple resin system decorative laminates of the invention, excellent results have been obtained with about 5 to 9 and preferably 7 or 8 core sheets impregnated with the vinyl ester resin treating composition at a resin content of about 38 to 42 weight percent, and dried at about 180° to 260° F. to a volatile content of generally about 1.5 to 4 percent by weight and preferably about 2 or 3.5 percent by weight.

The resulting laminates are generally about 0.05 to 0.07 inches in thickness, have improved flexibility as well as good color match, and possess the desirable properties of resistance to chipping, punchability, ease of handling and fabrication as well as retaining the normal expectations on stain resistance, scratch resistance, surface wear, etc.

A preferred process for manufacturing a laminate of the present invention comprises stacking the impregnated sheets, after at least partial drying, in the desired number and configuration and placing the stack between stainless steel press plates. An optional texturizing sheet may be used and placed between the face sheet and one of the plates to provide gloss and texture to the face sheet, the texturizing sheet being removed after pressing. Thereafter, a pressure of from about 800 to 1400 psi at temperatures from about 240° F. to 350° F. is exerted on the press plates for periods of from 20 minutes to 90 minutes to effect the cure and thereby provide the high pressure decorative laminate.

The following example is intended to illustrate the invention but not to limit it in any way.

EXAMPLE 1

A print or face sheet was prepared by treating a roll of pigmented alpha-cellulose decorative paper with a melamine formaldehyde reaction product, the paper being one with a basis weight of approximately 69 pounds per 3000 Ft$^2$. The melamine/formaldehyde reaction product was prepared by reacting 1.4 moles of formaldehyde per mole of melamine and adding 5 to 10 percent by weight of sucrose as modifier.

The web of paper was carried over a reverse roll applicator for resin impregnation, and through an air knife for metering resin to obtain a resin content of 55 percent. The web was dried in a treater oven to a volatile content of 6 percent and the proper sheet lengths were cut from the web.

The vinyl ester impregnated core sheet was prepared by treating a roll of pigmented alphacellulose decorative paper with a basis weight of 90 pounds per 3000 Ft$^2$ in a core sheet treating composition containing a vinyl ester resin. The vinyl ester resin is a bisphenol-epichlorohydrin epoxy base containing 45 percent by weight styrene, commercially available from Interplastics Corporation as COREZYN VE 8300. The presence of the styrene reduces the viscosity of the resin to 500 cps. The bisphenolepicholorohydrin epoxy base is of the formula:

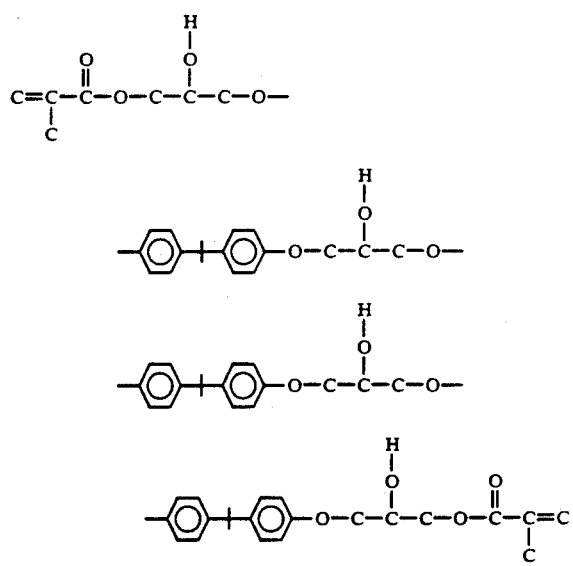

The Viscosity of the resin was reduced to 50 cps by diluting the resin with acetone. The acetone addition further enhances resin penetration into the paper. Tertiary butyl perbenzoate, a high temperature curing catalyst, was also included. The core sheet treating composition in particular contained:

400 g COREZYN VE 8300
12 g Tertiary Butyl Perbenzoate
80 g Acetone 0.2 g CAO3

The core sheet treating composition was used to treat the pigmented core sheets to the following specs:
RC 35-40%
Volatile 3-5%
Flow 0.5-2%

The web of alpha-cellulose paper was carried through the vinyl ester resin filed dip pan and through mayer rods to obtain the desired resin content of 38 percent. The web was dried to a volatile content of 4 percent and cut to a sheet length comparable to the print sheet.

The solid color laminate was constructed by assembling the component sheets as illustrated below:
1 Finish paper—aluminum foil release sheet
1 Melamine Treated Decorative Sheet (Face Sheet)
7 Vinyl Ester Treated Core Sheets
1 Melamine Treated Decorative Sheet (Back Sheet)

The sheets were consolidated in a hydraulic press under 1200 psi pressure and at a peak temperature of 280° F. for a total cure cycle of one hour. After pressing, the finish paper was removed and the laminate was trimmed and sanded.

The resultant consolidated laminate exhibited good flexibility, improved toughness, punchability and craze resistance when subjected to hot and cold temperatures, as exhibited by the following tests. The "polyester" used for comparison purposes below was a condensation product, commercially known as MELCOR ® and obtained from Pioneer Plastics.

| TEST DATA | CURRENT INVENTION | POLYESTER PRODUCT |
| --- | --- | --- |
| Flexibility | 3" | 3" |
| Radiant Heat, LD 3.7 | 210 | 123 |
| Blister, LD 3.15 | 79 | 64 |
| Craze | No effect | No effect |

The craze resistance was determined by subjecting the laminate to oven temperatures of 150° F. for 24 hours, 20° F. for 24 hours, and repeating the product exposure to temperature extremes for five days.

Furthermore, uniform coloration was apparent throughout the laminate. In particular, the color in the core sheets matched the color of the face and back sheets. The laminate was flexible as evidenced by a room temperature wrap test in which the laminate wraps around a 2 to 3 inch radius.

The foregoing description of the invention is illustrative and explanatory thereof. Those of ordinary skill in the art may, upon reading and understanding this disclosure, appreciate changes and modifications which may be made which do not depart from the scope and spirit of the invention as described above or claimed hereafter. It is intended that all such variations are within the scope and spirit of the appended claims.

What is claimed is:

1. A laminate which comprises at least one core sheet having impregnated therein, at least a partially cured, core sheet treating composition comprising a vinyl ester resin derived from an epoxide terminated resin and an ethylenically unsaturated organic carboxylic acid.

2. The laminate of claim 1, comprising at least two core sheets having impregnated in each said core sheet treating composition.

3. The laminate of claim 1, wherein the epoxide terminated resin is a diglycidyl ether epoxy resin.

4. The laminate of claim 3, wherein the diglycidyl ether epoxy resin is derived from a bisphenol compound and a halo-epoxy-substituted alkane.

5. The laminate of claim 4, wherein the bisphenol compound is Bisphenol A and the halo-epoxy-substituted alkane is epichlorohydrin.

6. The laminate of claim 3, wherein the acid is a monobasic acid selected from the group consisting of acrylic, methacrylic, crotonic, isocrotonic, and cinnamic acid.

7. The laminate of claim 6, wherein the monobasic acid is methacrylic acid.

8. The laminate of claim 1, wherein the carboxylic acid is either a dicarboxylic acid or a half-ester formed by esterification of one mole of a hydroxy compound and one mole of an anhydride of an ethylenically unsaturated dicarboxylic acid.

9. The laminate of claim 8, wherein the dicarboxylic acid is selected from the group consisting of maleic and fumaric acid.

10. The laminate of claim 7, wherein the vinyl ester resin is of the formula:

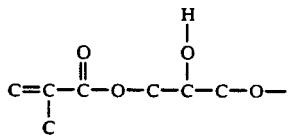

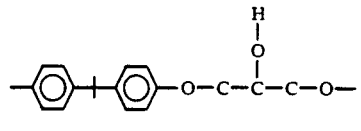

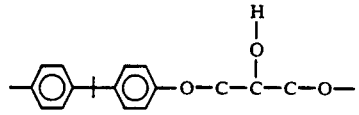

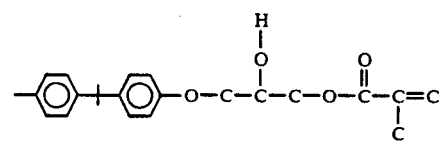

11. The laminate of claim 1, wherein the core sheet treating composition further comprises an ethylenically unsaturated crosslinking monomer selected from the group consisting of styrene, divinylbenzene, alpa-chlorostyrene, p-bromostyrene, t-butylstyrene, methyl methacrylate, and 2,3-dibromomethyl methacrylate.

12. The laminate of claim 11, wherein the ethylenically unsaturated crosslinking monomer is styrene.

13. The laminate of claim 12, wherein said ethylenically unsaturated crosslinking monomer comprises between about 20 to about 60 weight percent of said core sheet treating composition.

14. The laminate of claim 11, wherein said core sheet treating composition further comprises a high temperature free-radical generating polymerization initiator.

15. The laminate of claim 14, wherein said initiator is an organic peroxide or inorganic persulfate.

16. The laminate of claim 11, wherein said core sheet treating composition further comprises between about 10 to about 60 parts by weight of organic solvent.

17. The laminate of claim 16, wherein said core treating composition comprises approximately 45 parts by weight of said vinyl ester resin, about 36.5 parts by weight of styrene, about 2.5 parts by weight of t-butyl perbenzoate, and about 16 parts by weight of acetone.

18. The laminate of claim 1, further comprising adjacent to said core sheet a thermosetting melamine/formaldehyde reaction product impregnated face sheet.

19. The laminate of claim 18, wherein the melamine/formaldehyde reaction product in said face sheet is a precondensate prepared from about 1.0 to about 2.7 moles of formaldehyde per mole of melamine.

20. The laminate of claim 19, wherein said reaction product further contains a sucrose modifier.

21. The laminate of claim 18, wherein said laminate further contains a melamine/formaldehyde reaction product impregnated back sheet.

22. The laminate of claim 18, wherein the carboxylic acid of said core sheet treating composition is a monobasic acid selected from the group consisting of acrylic, methacrylic, crotonic, isocrotonic, and cinnamic acid.

23. The laminate of claim 22, wherein the monobasic acid is methacrylic acid.

24. The laminate of claim 22, wherein the epoxide terminated resin of said core sheet treating composition is a diglycidyl ether epoxy resin.

25. The laminate of claim 24, wherein the vinyl ester resin is of the formula:

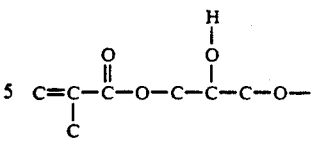

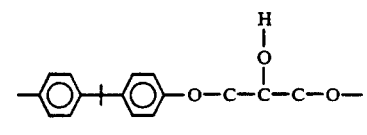

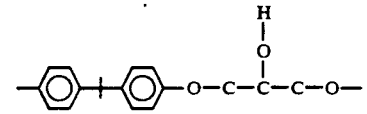

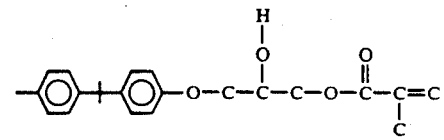

26. The laminate of claim 24, wherein the core sheet treating composition further comprises an ethylenically unsaturated crosslinking monomer selected from the group consisting of styrene, divinylbenzene, alpachlorostyrene, p-bromostyrene, t-butylstyrene, methyl methacrylate, and 2,3-dibromomethyl methacrylate.

27. The laminate of claim 26, wherein the ethylenically unsaturated crosslinking monomer is styrene.

28. The laminate of claim 27, wherein said ethylenically unsaturated crosslinking monomer comprises between about 20 to about 60 weight percent of said core sheet treating composition.

* * * * *